May 14, 1963 R. F. THORNTON 3,089,349
LOCKING DIFFERENTIAL
Filed March 28, 1960 8 Sheets-Sheet 3

INVENTOR
RAY F. THORNTON
KOTTS & SHERIDAN
ATTORNEYS

May 14, 1963  R. F. THORNTON  3,089,349
LOCKING DIFFERENTIAL

Filed March 28, 1960  8 Sheets-Sheet 8

FIG_13

INVENTOR
RAY F. THORNTON
ROBERT H. ELLIOTT
AGENT

United States Patent Office 3,089,349
Patented May 14, 1963

3,089,349
LOCKING DIFFERENTIAL
Ray F. Thornton, Dexter, Mich.
Filed Mar. 28, 1960, Ser. No. 18,795
13 Claims. (Cl. 74—710.5)

The present invention relates to a locking differential construction and particularly to a self-contained locking means which is hydraulically actuated and operates automatically. This application is a continuation-in-part of my co-pending application S.N. 732,987, filed May 5, 1958, now abandoned.

The purpose of a locking differential in a vehicle such as an automobile for example, is to provide effective driving torque to both driven wheels under varying tractive conditions. With a conventional differential, one of the powered wheels will slip when it encounters a low traction surface. The driving force of the vehicle is only equal to that provided by the least efficient wheel.

Various types of locking differentials have been proposed, but not much has been accomplished in the way of an automatic hydraulically actuated locking differential. The high pressures encountered and resultant wear have been the most difficult problems to solve in connection with a successful hydraulically actuated locking differential. Low efficiency and high cost also present a serious problem.

It is a principal object of the present invention to provide a differential power transmission which can be locked hydraulically and still provide normal differential action when required.

It is another object of the present invention to provide a hydraulically actuated differential power transmission which is highly efficient with a long, trouble-free service life.

It is a further object of the present invention to provide such a differential power transmission which is commercial in size and cost of manufacture.

Other objects of this invention will appear in the following description and appended claims, reference being had to the accompanying drawings forming a part of this specification wherein like reference characters designate corresponding parts in the several views.

Figure 1:
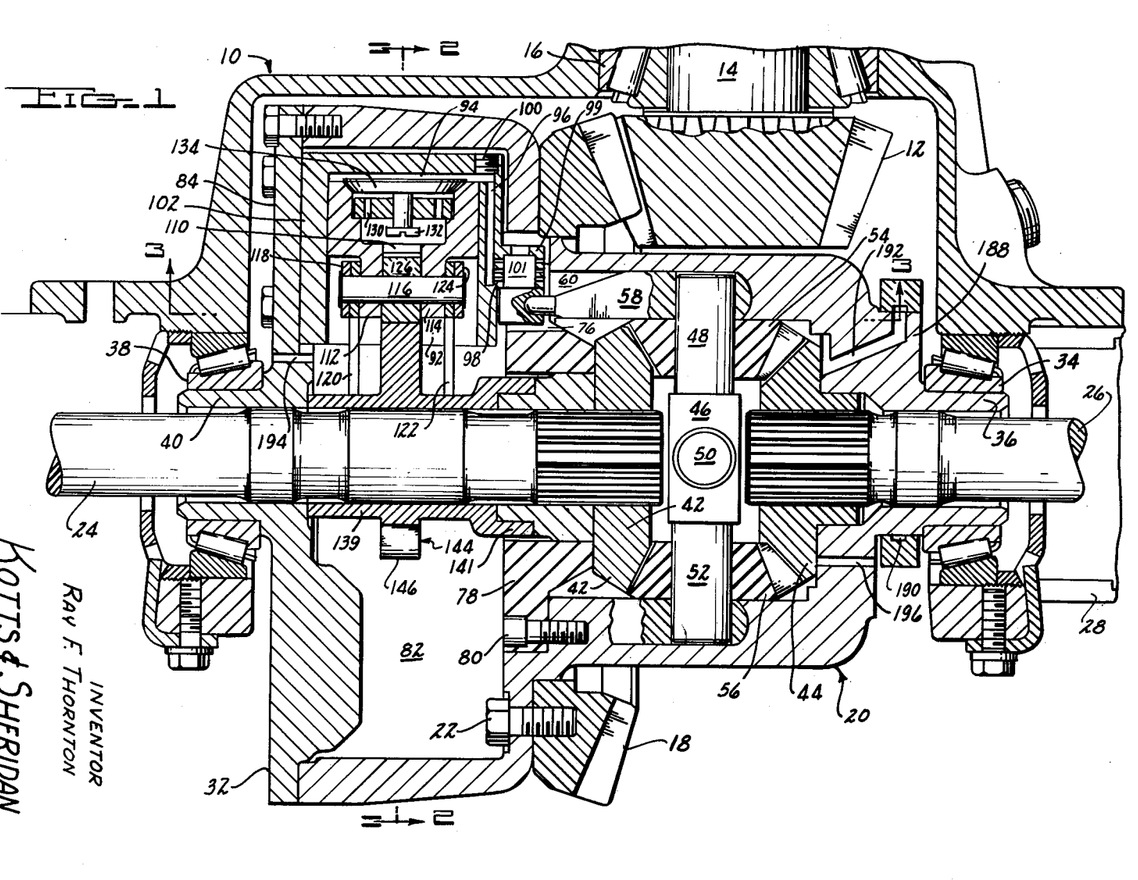
FIG. 1 is a mid-sectional plan elevation of the differential power transmission of the present invention disposed between the driving axles of a motor vehicle.

An embodiment of the differential power transmission of the present invention is shown in the drawings in the driving axle construction of an automobile. It comprises a differential housing 10 which may be affixed to the vehicle in any number of well-known ways. The drive pinion 12 is disposed within the housing on the end of drive shaft 14. The drive shaft 14 is positioned in bearing 16 and is coupled to the propeller shaft of the vehicle drive line through a universal joint (not shown). The drive pinion 12 is in mesh with the ring gear 18 which is affixed to the differential case 20 by suitable means as the bolts 22. Thus, the differential case 20 is rotated in conventional manner through the drive pinion 12 and ring gear 18. A pair of axle shafts 24 and 26 extend through axle tubes such as the tube 28 into the interior of the differential housing 10. A wheel (not shown) is provided on the end of each axle shaft. The differential case 20 is provided with a cover 32 which is bolted thereto. A bearing 34 is disposed between the housing 10 and the hub 36 on the differential case 20. A bearing 38 is disposed between the housing 10 and the hub 40 on the differential case cover 32. Thus, the differential case 20 is rotatably disposed within the housing 10.

A pair of side gears 42 and 44 are disposed within the differential case 20. The axle shafts 24 and 26 are in splined engagement with the central openings in the side gears 42 and 44. A spider 46 is disposed within the differential case 20 between the side gears 42 and 44. The spider 46 has four radially extending spider pins extending therefrom. Three such spider pins 48, 50 and 52 are shown in FIG. 1 of the drawings. Four pinion gears are provided, one rotatably disposed on each of the spider pins. Two such pinion gears 54 and 56 are shown in FIG. 1 of the drawings. These pinion gears are in mesh with the two side gears 42 and 44. Four operating levers are provided, one disposed over the free end portion of each spider pin. One such operating lever is shown at 58 in FIGS. 1, 3 and 4 of the drawings.

Figure 3:
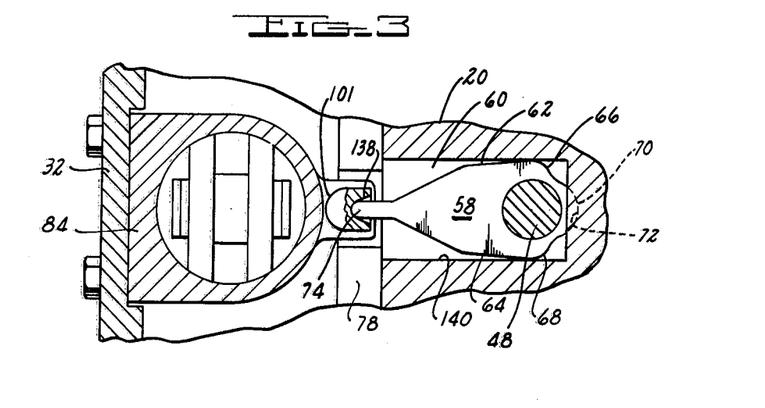
FIG. 3 is a fragmentary section along the line 3—3 in FIG. 1, the operating lever 58 being shown in the neutral position.
Figure 4:
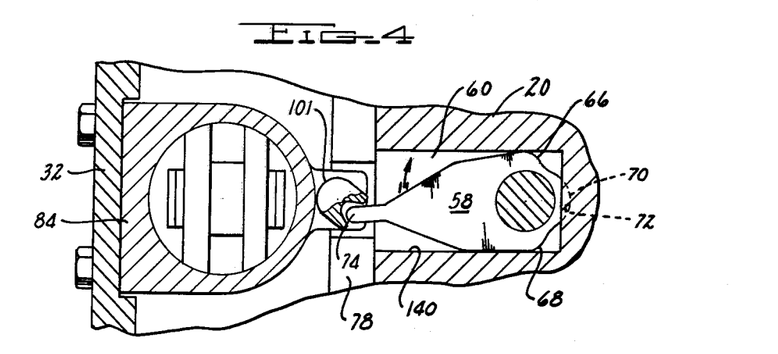
FIG. 4 is a view similar to FIG. 3 showing the operating lever in the position which effects locking.

The details of the operating lever 58 will be discussed, and it is to be understood that the details of the other three operating levers are identical. A chamber 60 is provided in the differential case 20, and the operating lever 58 is disposed in this chamber. The operating lever 58 has tapered side portions 62 and 64 and rounded shoulders 66 and 68. The operating lever 58 also has a rounded end portion 70 which seats in a rounded seat 72 in the chamber 60. The operating lever 58 also has a finger portion 74 which includes a rounded end. The finger portion 74 extends into an opening 76 of the gear retainer plate 78. The gear retainer plate 78 is bolted to the differential case 20 with the bolts 80. This gear retained plate 78 backs up the side gear 42 and absorbs axial thrust which may be developed in the side gear. The operating lever 58 is disposed on the pin 48 so that the distance between the center of the pin 48 and the end of finger portion 74 is much greater than the distance between the center of the pin 48 and the rounded end portion 70. Thus, the finger portion 74 will travel a much greater distance than the rounded end 70 when the lever 58 is rotated on the pin. In practice, the difference in travel has been at least ten times greater. Clearances between the operating lever 58 and the walls of the chamber 60 are sufficient to provide a limited lost motion connection between the spider 46 and the differential case 20 to effect movement of the operating lever 58 between the operating positions described. Thus, an actuating means is provided for controlling the opening and closing of valves (to be described) which regulate flow of hydraulic fluid for a purpose also to be described.

A cylinder chamber 82 is provided in the differential case 20. Four cylinders 84, 86, 88 and 90 are bolted or cast integral with the differential case cover 32. The construction of all four cylinders is the same, so only the details of the cylinder 84 will be discussed. The cylinder 84 is provided with a central cylinder bore 92. The cylinder 84 is also provided with a lateral passage 94 which communicates with a substantially vertical passage 96 (FIG. 1). The bottom of the passage 96 communicates with several openings 98 provided in a valve housing 99 formed on the cylinder 84. A plug is shown at 100. This plug 100 fills the hole in the top of the cylinder 84 which was necessary to permit drilling the blind passage 96. A valve spool 101 is disposed in the valve housing 99.

Figure 2:
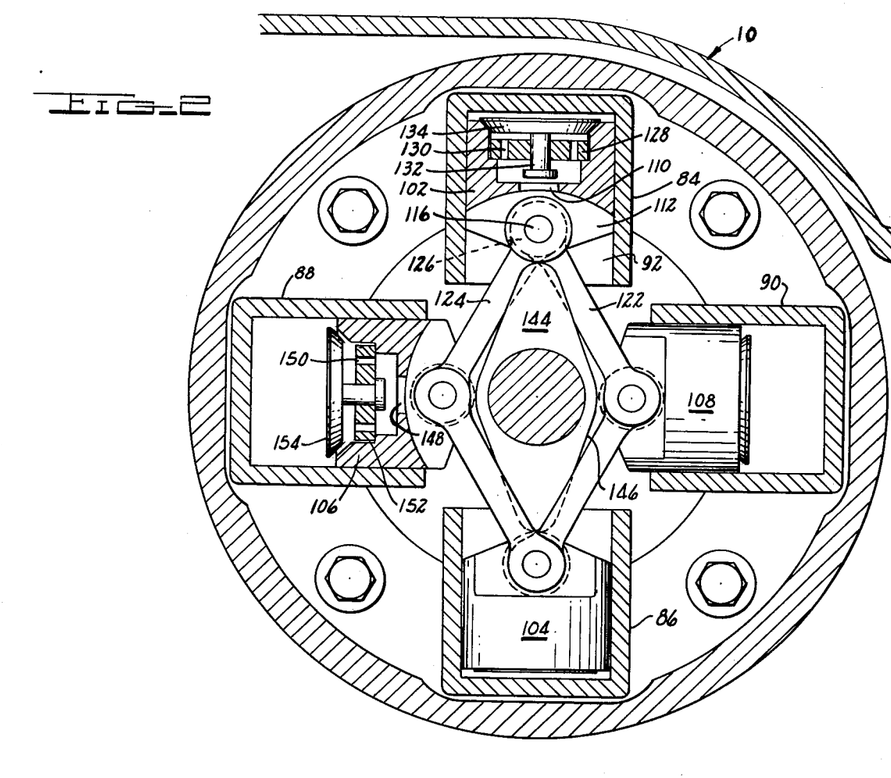
FIG. 2 is a sectional elevation along the line 2—2 in FIG. 1.

Four pistons 102, 104, 106 and 108 are provided in the cylinders 84, 86, 88 and 90 respectively. All of these pistons are identical in detail, so only the piston 102 will be discussed at length. The piston 102 includes an opening 110 therein, and a pair of arms 112 and 114 adjacent the said opening. A pin 116 is disposed laterally through openings in the piston arms 112 and 114. Connecting rods 118, 120, 122 and 124 are positioned over the ends of the pin. There are eight connecting rods in all. These connecting rods connect the pistons 102, 104, 106 and 108 together. Four of the connecting rods are shown in FIG. 2 connected to one set of arms of the pistons, such as the arm 112 of piston 102. Four additional connecting rods are placed in connection with the other arms of the pistons such as the arm 114 of piston 102.

A roller 126 is rotatably disposed on the pin 116 between the arms 112 and 114 of the piston 102. As previously explained, all four piston constructions are identical so there are four rollers such as the roller 126.

A valve retainer 128 is disposed in threaded engagement with the piston 102. The valve retainer 128 has a plurality of holes 130 disposed therein. A pin 132 is disposed through a central opening in the valve retainer 128. The pin 132 has a head on one end and is affixed to a valve disc 134 at the other end. The valve disc 134 has a tapered portion which seats on a tapered valve seat in the piston 102.

Figure 6:
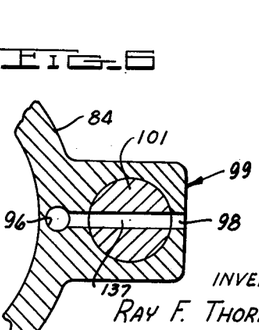
FIG. 6 is a view similar to FIG. 5, showing the open position of the valve, which permits normal differential action.

One portion of the valve spool 101 is provided with openings 137 therethrough which openings 137 match the openings 98 in the valve housing 99 when the valve spool 101 is rotated to a specific position (FIG. 6). The lower portion of the valve spool 101 is provided with a rounded track 138 (FIG. 3) which engages the finger 74 on the operating lever 58.

A collar 139 is provided over axle shaft 24. One end of the collar has clutch fingers 141 which inter-engage clutch fingers on side gear 42. A cam member 144 is formed on collar 139. The cam member 144 provides a cam face 146 which is adapted to engage the rollers on the pistons, such as roller 126 on piston 102.

Figure 5:
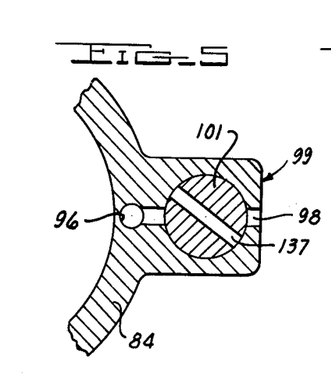
FIG. 5 is a fragmentary section through one of the valve housings and valve spools, showing the closed position of the valve, which results in locking.

The operation of the differential power transmission herein defined is as follows:

When the vehicle starts to move, power is transferred from the drive pinion 12 to the ring gear 18 and the differential case 20 to which it is affixed. This causes the four operating levers 58 to pivotally move about their respective spider pins 48. The action of one of the operating levers 58 will be discussed in detail, and it is to be understood that the operation of the other three operating levers 58 is identical. The backwall 140 of chamber 60 (FIG. 3) moves against the rounded shoulder 68 on the operating lever 58, and the lever 58 pivots until the full side 64 is engaged with the backwall 140. The lever 58 ends up in the position shown in FIG. 4. This action results in rotating valve spool 101 clockwise in FIG. 3 through the finger 74 moving along the track 138. The valve is then in the closed or locked position as shown in FIG. 5, and the openings 137 in the valve spool 101 are out of line with the openings 98 in the valve housing 99. Driving power is transferred from the case 20 through the spider 46, through the pinion gears to the side gears, and then to the angle shafts 24 and 26.

The cam collar 139, which is rotating with axle shaft 24, has a tendency to reciprocate the pistons 102, 104, 106 and 108. However, hydraulic fluid trapped in the top of the cylinders 84, 86, 88 and 90 keeps the valve discs (such as valve disc 134) closed. Since the outlet passage 96 is closed by the valve spool 101, the hydraulic fluid cannot be circulated. Thus, the two axle shafts 24 and 26 are rotated together. If one vehicle wheel should happen to encounter a surface of poor traction, it will not spin relative to the other wheel.

Although the differential is fully locked when driving straight ahead, it will perform the normal differential function when needed, as in a turn. Assume that the vehicle is making a right turn. Since the left wheel must travel a greater distance during the turn than the right wheel, the left wheel travels at a greater speed of rotation than the differential case, and the right wheel rotates slower than case speed. This creates a leverage action across the differential gear which results in a force on the spider pins tending to return them relative to case 20 to the neutral position (FIG. 3) along with the operating levers. Thus, referring to operating lever 58, it is rotated in the direction of the arrow (FIG. 4). The rounded shoulder 70 rotates in the rounded groove 72 in the case, and the rounded shoulders 66 and 68 rotate against the adjacent walls of the chamber 60. As the arm 58 rotates clockwise, it rotates the valve spool 101 in a counterclockwise direction until the passages 137 in the valve spool 101 are aligned with the openings 98 in the valve housing 99 (FIG. 6). In this position, hydraulic fluid can be freely circulated, and differential rotation of the wheels is effected as long as the outside wheel is advancing faster than it is being driven.

The axle shaft 24 rotates faster than the axle shaft 26, and as it rotates, the cam collar 139 is carried with it. The piston rollers, such as roller 126, travel over the cam surface 146 of the cam collar 139. One pair of diametrically opposed pistons will be moved outwardly, while the other pair of diametrically opposed pistons will be moved inwardly, since all four pistons are connected by the connecting rods (120 and 122 for example). FIG. 2 shows the action as the piston 102 is moved outwardly. The valve disc 134 is seated and the top of piston 84 moves the hydraulic fluid through passages 94, 96, 98 and 137 (also see FIG. 6). The same action takes place relative to piston 104.

At the same time, the pistons 106 and 108 will be moving inwardly. This action is shown particularly with respect to piston 106 in FIG. 2. As piston 106 moves inwardly, hydraulic fluid moves up through the open bottom of piston 106 and through the opening 148. It travels through the passages 150 in the valve retainer 152 and against the valve disc 154, unseating the valve disc. Thus, the hydraulic fluid travels freely through the piston as it is drawn inward.

When the turn is completed and the wheels regain rotational speed which equals the rotational speed of the differential case 20, the operating levers 58 again move to the locked position shown in FIG. 4, and the valve spools 101 are returned to the closed position shown in FIG. 5. The vehicle wheels are again locked for rotation together.

The same type of action occurs in a left turn. Also, the device will function in the same manner when the vehicle is backing up since both sides of the operating leavers 58 are identical.

Figure 7:
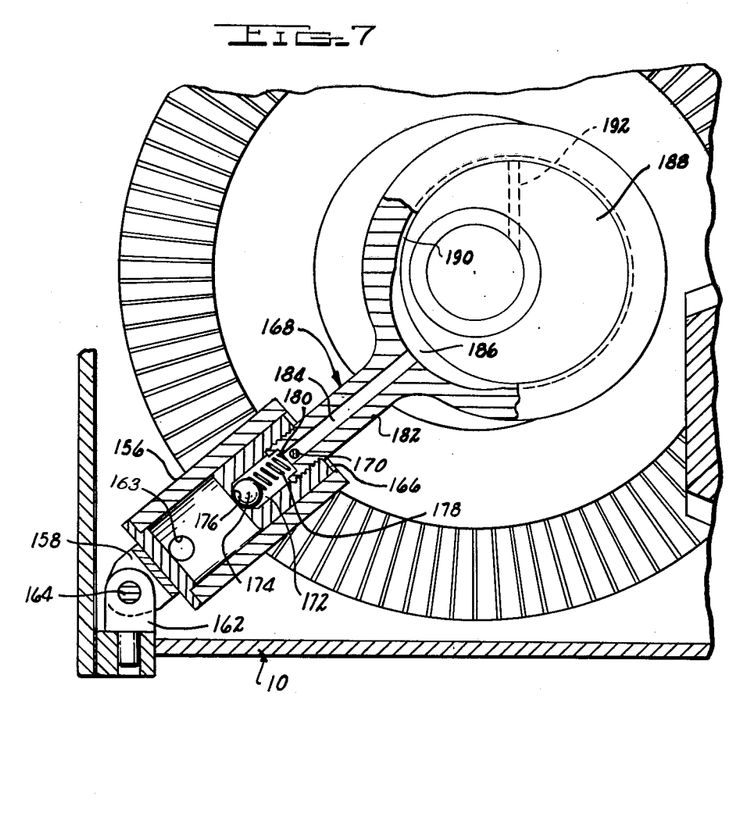
FIG. 7 is an end elevation, partly in section, showing the fluid pump which is used to keep the differential case filled with fluid.
Figure 8:
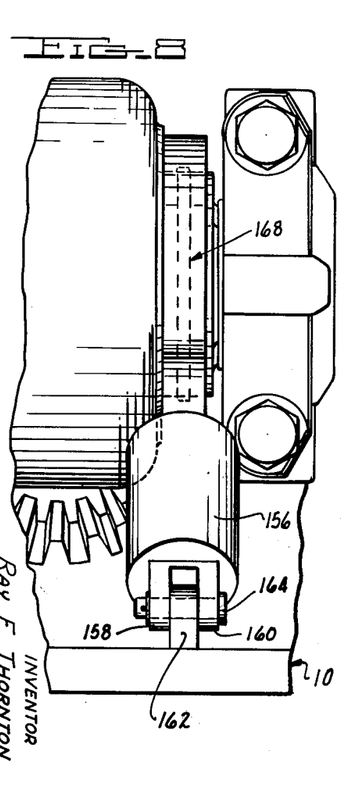
FIG. 8 is a fragmentary rear elevation showing the fluid pump of FIG. 7.

It has been found that under conditions of high speed, centrifugal force has some tendency to throw the hydraulic fluid outwardly against the differential housing 10. In order to make certain that sufficient hydraulic fluid is available at the pistons, a simple pump mechanism is provided. This pump is shown in FIGS. 7 and 8 of the drawings. It includes a cylinder 156 having a pair of lugs 158 and 160.

These lugs straddle a boss 162 provided in the housing 10, and the cylinder 156 is pivotally mounted to the boss by a pin 164. An opening 163 is provided in the side of the cylinder 156 to permit entry of hydraulic fluid.

A piston 166 is slidably mounted in the cylinder 156. It is affixed to a connecting rod 168 by teh pin 170. A passage 172 is provided in the center of piston 166 and a ball 174 is positioned in the passage on a tapered seat 176. A spring 178 extends between the ball 174 and a shoulder 180 in the piston 166. The connecting rod arm 182 has a central passage 184 therethrough which communicates with passage 172 in piston 154. The passage 184 communicates with chamber 186.

The connecting rod 168 is mounted on the eccentric hub 188 of case 20 and includes an annular passage 190 which communicates with passage 192 in case 20.

The pump operates as follows: as the differential case 20 is rotated by the power source, the eccentric pump hub 188 on the case 20 reciprocates the piston 166 in the cylinder 156. As the piston 166 moves up in cylinder 156, hydraulic fluid is drawn into cylinder 156 through the opening 163. As the piston 166 moves down, the fluid exerts pressure against the spring loaded ball 174, and the ball is moved off the seat 176. Fluid then travels through passage 172 in piston 166, through passage 184 in the connecting rod arm 182, into chamber 186 and around passage 190 in the connecting rod 168 into passage 192 in the case 20. This action keeps the case 20 filled with fluid even at high rotational speeds of the case.

Openings 194 and 196 are formed in the case to spray oil from the differential case against the bearings 34 and 38 and provide effective lubrication.

It will be noted that the cylinders 84, 86, 88 and 90 are provided in the largest diameter of the differential so that they normally will tend to receive a fluid supply due to centrifugal force.

The differential of the present invention provides a high volume, low pressure system which eliminates foaming. The pistons 102, 104, 106 and 108 are large in diameter, and the valve housings and valve spools are provided with multiple openings. This permits the passage of a large volume of fluid at relatively low pressures.

Referring next to FIGURES 9 to 12, a modified form of the invention will be described. As there shown, the differential case 524 is contained within the differential housing 510 and is a two part construction. The first portion of the case 524 carries the ring gear 522 and is identified by the numeral 526, while the cover, representing the second portion of the case 524 is identified by numeral 528. The cover 528 is secured to the case section 526 by bolts 532. Each of case sections 526 and 528 are journaled in roller bearings 534 and 536 which permit the case 524 to rotate within the differential housing 510.

Figure 9:
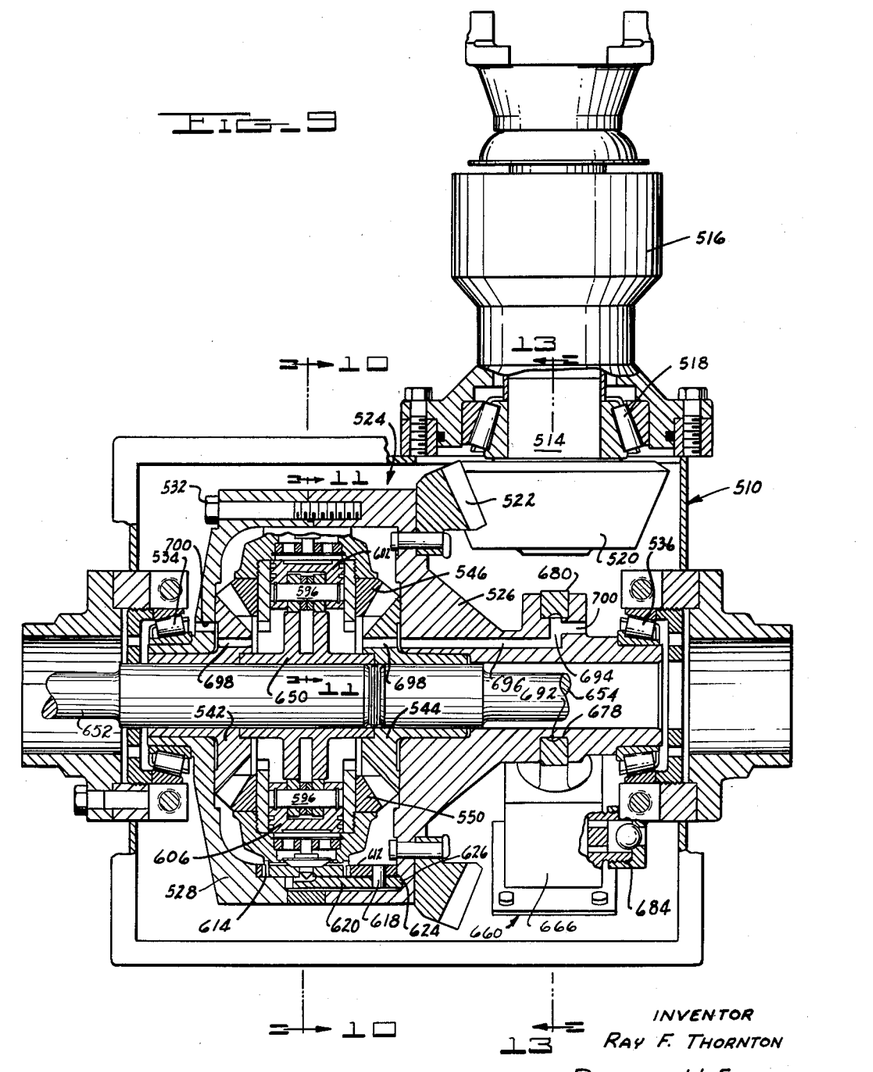
FIG. 9 is a cross sectional view through the center of a modified device embodying the present invention.
Figure 10:
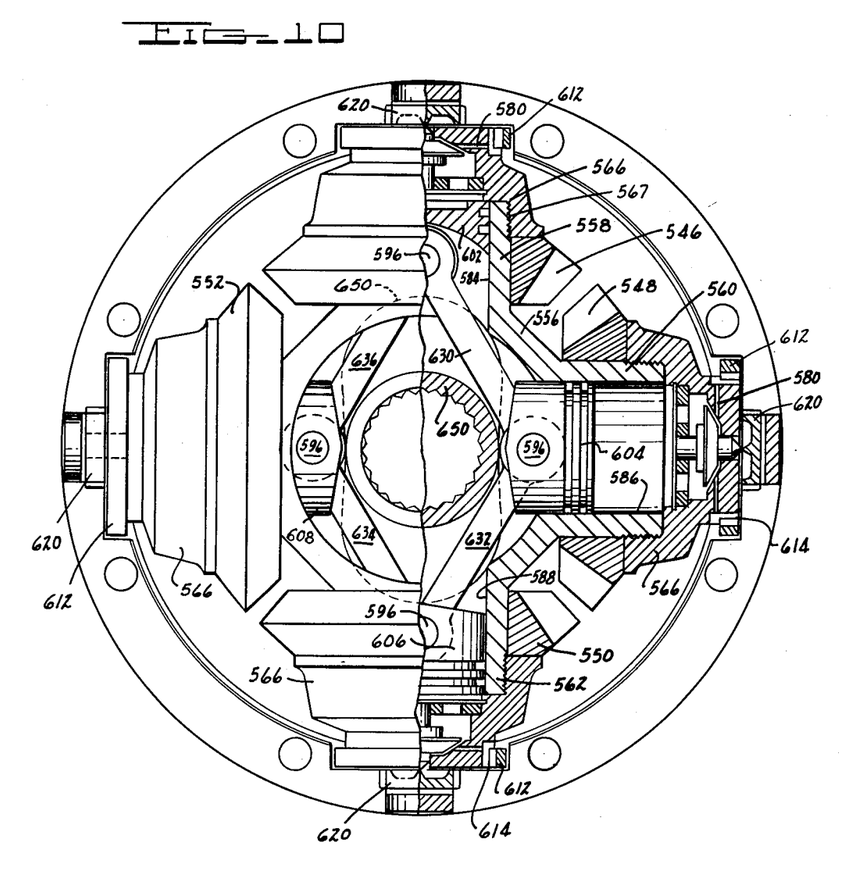
FIG. 10 is a cross sectional view taken generally along lines 10—10 of FIG. 9.

Housed within the differential case 524 are a pair of side gears 542 and 544 and four pinion gears 546, 548, 550 and 552. A symmetrical spider member 556 is disposed between side gears 542 and 544. The spider member 556 has four radially extending cylindrical portions 558, 560, 562 and 564 which carry the four pinion gears 546, 548, 550 and 552. One pinion gear is rotatably disposed on each of the cylindrical portions of the spider member 556. It will be noted that each of the pinion gears 546, 548, 550 and 552 are in mesh with the side gears 542 and 544 and are retained by a plurality of retainer cap members 566, one threaded onto the end of each of the cylindrical portions 558, 560, 562 and 564 of the spider member 556.

Figure 11:
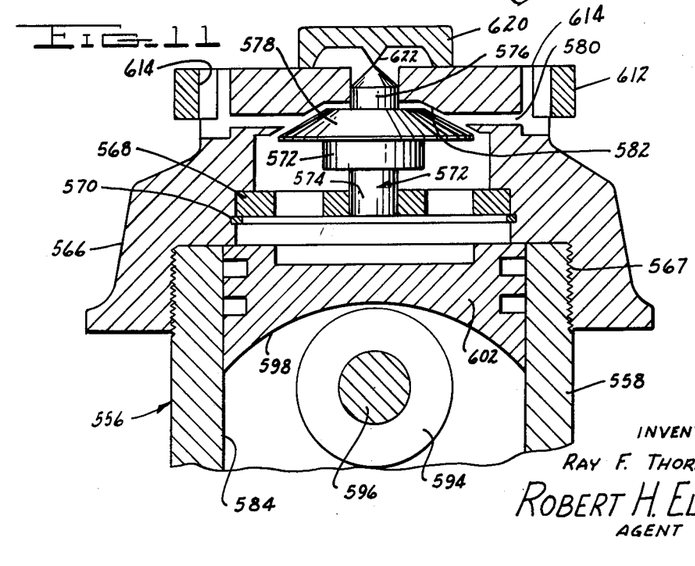
FIG. 11 is an enlarged cross sectional view taken along lines 11—11 of FIG. 9.

The spider member 556 has an axial opening extending therethrough and a plurality of centrally located cylindrical bores 584, 586, 588 and 590 (not shown) through each of the radial cylindrical members 558, 560, 562 and 564 (not shown). Each bore 584, 586, 588 and 590 is adapted to receive a piston member 602, 604, 606 and 608 therein. Since each of these pistons and the respective bores in which they are located are identical, only one piston 602 and cylindrical member 558 will be discussed. An enlarged view of that portion of the invention is illustrated in FIG. 11 of the drawings.

The radial cylindrical portion 558 of the spider 556 and the threaded portion 567 on the outer end thereof is adapted to receive the retainer cap 566 which is adjustably secured thereto. The retainer cap 566 permits adjustment of the pinion gear mounting distance and it also contains the valve control means for actuation of the present invention.

The piston member 602 in cylindrical bore 584 is adapted to reciprocate within the bore under certain conditions. The piston member 602 is generally round and has a cut-away section 598 on the lower portion thereof. Positioned at right angles to the cut away section 598 is a pin 596 which is adapted to position a pair of cam followers 594 and a pair of generally flat connecting rods 630 and 636.

The retainer cap 566 illustrated contains a valve stop 568 positioned by a retainer ring 570. One end 574 of the valve stem 572 is piloted in the valve stop 568 while the opposite end 576 of the valve stem is piloted in a bearing section on the retained cap 566 and terminates in a conical point. A disc valve element 578 located intermediate the ends of the valve stem 572 also has a conical section which seats in the internal conical end or seat 582 of the retainer cap 566. A plurality of horizontal openings 580 in the retainer cap 566 intersect the conical seat 582.

Figure 12:
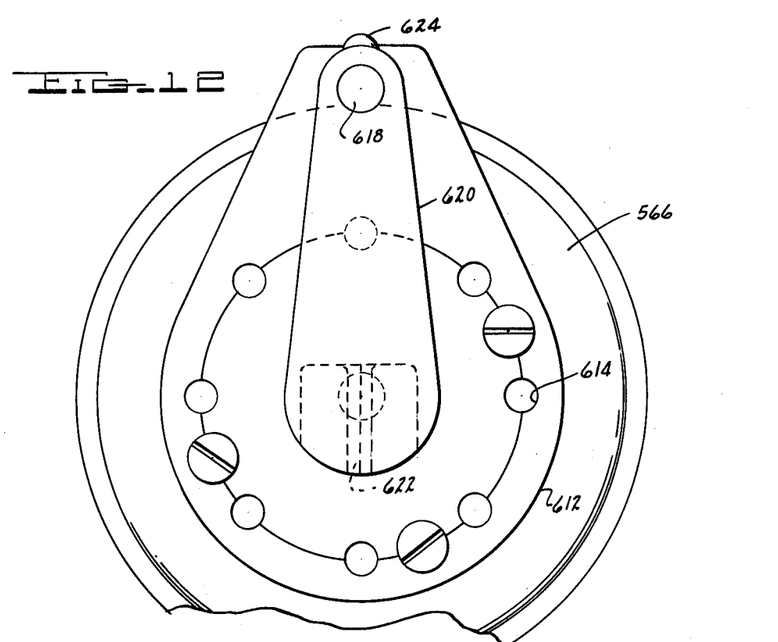
FIG. 12 is a top plan view of the valve mechanism.

The outer end of the retainer cap 566 has an apertured arm member 612 secured thereto as can be seen in FIGS. 9 and 12 of the drawings. A plurality of vertical openings 614 are provided between the inner periphery of the arm 612 and the outside diameter of the retainer cap 566, which openings 614 provide communication between the horizontal openings 580 in cap 566 and the interior of case 524. A pivot pin 618 mounted on arm 612 pivotally supports a finger member 620 on the arm 612. As with respect to the previously described embodiment of the invention, a limited amount of lost motion exists between spider 556 and the case 524 to enable pivotal movement of the finger members 620. A knife edge 622 is located on the underside of the finger member 620 immediately above the conical end 576 of the valve stem 572. The opposite end of the finger member 620 has a spherical radius 624 thereon which is seated in a similar spherical radius 626 in case half 526.

Referring to FIG. 9 again, it will be noted that a cam 650 is located between the side gears 542 and 544 and in contact with the cam followers 594 positioned inside the pistons 602 and 606. The configuration of the cam is best viewed in FIG. 10. Connecting rods 630, 632, 634 and 636 pivotally mounted at their opposite ends on pins 596 maintain the cam followers 594 in contact with said cam 650.

An axle shaft 652 extends through the side gear 542 and the cam 650 in splined engagement. A second axle shaft 654 extends through side gear 544 in splined engagement. With this construction, a relative movement of one axle shaft with respect to the other can occur.

Figure 13:
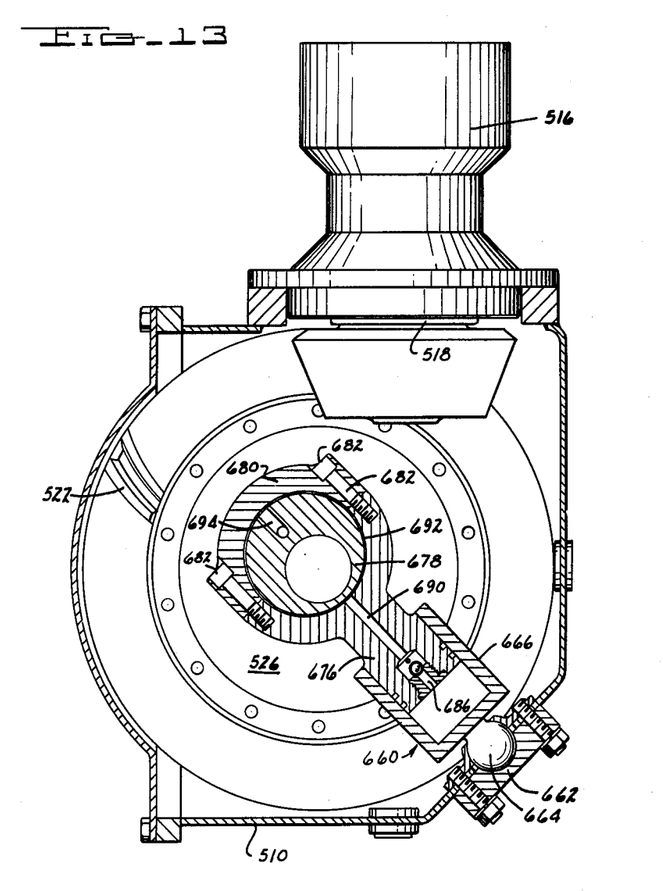
FIG. 13 is a cross sectional view taken generally along lines 13—13 of FIG. 9.

A simple pump mechanism 660 for the supply of hydraulic fluid is illustrated in FIG. 13 of the drawings. A socket member 662 is provided in the housing 510, while a ball member 664 is provided on the pump cylinder 666. A piston 676 is slidably mounted in pump cylinder 666 and is connected to an eccentric 678 on the differential case 526 with a retainer cap 680. Screws 682 secure the retainer cap to the piston. A first ball check 684 (see FIG. 9) is positioned in the cylinder 666 and a second ball check 686 is provided on the face of the piston. A fluid passage 690 extends from the piston 676 to the eccentric 678. A second passage 692 circumscribes the eccentric 678 and communicates with a third passage 694 in the eccentric 678 which in turn communicates with a fourth horizontal passage 696 in the case 526. A plurality of passages 698 extend through the side gears 542 and 544. Thus, turning of the ring gear 522 and the attached case section 526 will actuate pump mechanism 660 to cause pumping of differential fluid from the housing 510 to the interior of case 524 via the passages 690, 692, 694, 696, 698 and outwardly around the side gears 542 and 544. From here the differential fluid is available to flow to the outer ends of cylindrical bores 584, 586, 588 and 590.

The operation of the differential power transmission herein defined is as follows.

When the vehicle is moved forward, power is transfered from the drive line to the drive pinion 520, thereby rotating the ring gear 522 and the differential case assembly 524 to which it is affixed. This causes the whole assembly to rotate as a unit including the pump 660. As this occurs, the fingers 620, positioned on arms 612 are caused to move rearward thereby allowing the conical ends 576 of the valve stems 572 to move up and seat the valve discs 578 in all four places. This traps the fluid intermediate the ends of the pistons 602, 604, 606 and 608 and the closed valve discs 578, thereby locking the differential.

Since the axle shaft which extends through the side gear 542 and cam 650 cannot be rotated singly, the force exerted by the cam 650 against the pistons 602, 604, 606 and 608 prevents rotation of the axle shaft, thereby causing the side gear 542 to hold the pinion gears 546, 548, 550 and 552 which in turn hold side gear 544 which is splined to the opposite axle shaft. The complete case assembly 524 will then be driven as a single unit. Thus, if one wheel (not shown) encounters a non tractive surface, it will not spin relative to the other wheel.

Although the differential is fully locked when driving straight ahead, it will allow differential action when necessary. In a turn either to the right or left, one wheel must travel a greater distance than the other. In effect this causes one of the wheels to attempt to rotate in reverse relative to the other since the ring gear 522 is driving the case 524 and the wheel traveling the greatest distance. When this occurs one side gear moves with respect to the other, thereby causing the fingers 620 to open the four valves in the retainer caps 566. The hydraulic fluid is then allowed to be freely circulated in and out of the cylinders 584, 586, 588 and 590.

However, as soon as the differential action is complete and the wheels start to move forward at the same rate, the fingers 620 move to permit the valves 576 to again close, thereby locking the differential.

The pump 660 maintains the case full of fluid at all times. As the case assembly 524 is rotated, fluid is taken from the bottom of the housing 510 through ball check 684. As the piston 676 is caused to be moved further into the cylinder 666 by action of the eccentric 678, ball check 684 closes and ball check 686 opens allowing the fluid to pass through passages 690, 692, 694 and 696, and then through side gear 544 into the differential case 524. Any excess fluid is exhausted through a plurality of ports 700 to the housing 510. The discharge of excess fluid through ports 700 also provides a very effective means for lubricating the bearings 534 and 536.

It will be noted that the cylinders 558, 560, 562 and 564 in the spider member are of large diameter and that the intake passage 580 are so positioned as to be submerged in fluid at all times. The modified form of the invention provides a high volume of fluid and low pressures, thereby eliminating foaming.

Having thus described my invention, I claim:

1. A locking differential power transmission for use with a power source comprising a rotatable case member adapted to have fluid therein and to rotate about an axis, a pair of side gears rotatably disposed in said case member and each adapted to be affixed to a different one of a pair of driven shafts, a spider member in said case member and operatively connected to said case member so that limited relative rotational movement about said axis can occur between said members, a plurality of pinion gears rotatably disposed on said spider member, the teeth of said pinion gears being in mesh with the teeth of said side gears, cylinder means within said case member and integral with one of said members, said cylinder means being adapted to receive fluid from said case member, piston means disposed in said cylinder means, means coupled to said piston means and adapted to be coupled to one of said driven shafts for reciprocating said piston means in said cylinder means when said one shaft rotates relative to said case member, valve means associated with said cylinder means adapted for controlling flow of said fluid from said cylinder means, and valve actuating means operably connected between said members and responsive to limited relative rotational movement between said members for opening and closing said valve means at pre-established positions of said actuating means so that when the said members have moved to one position of relative rotational movement the valve means will be open allowing said piston means to reciprocate and the side gears to rotate relative to one another, and when the said members have moved to another position of relative rotational movement the valve means will be closed locking fluid in said cylinder means and thereby preventing reciprocation of said piston means and locking said side gears against relative rotation.

2. A locking differential power transmission as claimed in claim 1 wherein the cylindrical means are integral with said case member and extend radially inwardly toward the axis of rotation of said case member.

3. A locking differential power transmission as claimed in claim 1 wherein the cylindrical means are integral with said spider member and extend radially outwardly from the axis of rotation of said case member.

4. A locking differential power transmission as claimed in claim 1 wherein a pump is operably connected to said case member for pumping fluid into said case member when the latter is rotated by said power source.

5. A locking differential power transmission for use with a power source comprising rotatable driving means adapted to have fluid therein and responsive to application of power from said source to rotate about its axis of rotation, a differential gear set in said driving means mounted therein for limited relative lost-motion movement about said axis, a pair of driven shafts extending into said driving means and operatively coupled for differential action with different elements of said differential gear set, a piston and cylinder assembly in said driving means mounted for rotation therewith and coupled with one of said driven shafts so that the piston of said assembly will reciprocate when said one shaft rotates relative to said driving means, the cylinder of said assembly being adapted to receive fluid from said driving means, valve means operatively associated with said cylinder adapted for allowing or interrupting flow of said fluid from said cylinder and thereby allowing or impeding reciprocation of said piston, and valve actuating means operatively connected between said driving means and said differential gear set for closing said valve means in response to the driving means being moved to one position of its allowable lost-motion movement relative to said differential gear set and for opening said valve means in response to the driving means being in a different position of its allowable lost-motion movement relative to said valve means.

6. A locking differential power transmission as claimed in claim 5 where said one position of the driving means is the end of its allowable lost-motion movement relative to said differential gear set.

7. In a locking differential mechanism for use with a power source, the combination of a pair of coaxially aligned driven shafts, a differential housing adapted to have fluid therein, a rotatable differential case member in said housing and adapted to receive fluid from said housing, a pair of side gears rotatably disposed in said case member and each affixed to a different one of said pair of driven shafts, a spider member disposed between said side gears and having a plurality of spider pins extending therefrom, said members being connected together so that limited relative movements can occur therebetween about the axis of rotation of said case member in response to relative rotations of said shafts, a plurality of pinions one rotatably disposed on each spider pin in mesh with said side gears, a plurality of cylinders integral with one of said members and adapted to receive fluid from said case member, a plurality of pistons disposed one each in each of said cylinders, means coupling said pistons to one of said driven shafts for reciprocating said pistons when said one shaft rotates relative to said cylinders, passage means providing fluid communication between the interior of said cylinders and the interior of said case member, valve means in said passage means for opening and closing said passage means, and valve control means operatively connected between said spider member and said case member and responsive to relative movements between said members to open said valve means when limited movement of one member relative to the other occurs as an incident to one of said shafts commencing to rotate at a rate different from that of the other shaft, and to close said valve means when limited movement of the one member relative to the other occurs in the opposite direction as an incident to the shafts commencing to rotate at the same rate.

8. The combination claimed in claim 7, wherein the means coupled to said piston means comprise links pivotally connected to adjacent ones of the piston means, a cam follower on each of said piston means, a cam collar fixed to said one driven shaft, the cam collar having a cam surface thereon which is in engagement with said followers and has a configuration to effect reciprocation of said piston means when the cam collar rotates relative to the cylinder means.

9. In a locking differential mechanism for use with a power source, the combination of a differential housing, a rotatable differential case in said housing adapted to have fluid therein, a spider member in said differential case coaxially arranged therein for limited rotational movement relative to said case, a pair of side gears disposed in said differential case on opposite sides of said spider member, a plurality of differential pinion gears rotatably mounted on said spider member and in mesh with said side gears, a plurality of radially inwardly opening cylinder means closed at the radially outer ends and integral with said differential case, a pair of driven shafts connected for rotation respectively with said pair of side gears, a plurality of piston means reciprocably disposed in said cylinder means and having one-way valves therein for allowing fluid from said differential case to flow only into the closed end of said cylinder means on reciprocation of said piston means, means operably connected between one of said shaft members and said piston means for reciprocating the piston means when said one shaft rotates relative to said cylinder means, passage means having communication with the closed ends of said cylinder means for discharging fluid from said cylinder means, valve means in said passage means for closing and opening said passage means, and control means operatively connected between said differential case and said spider member for opening and closing said valve means respectively in response to relative movements between said differential case and said spider member to two different pre-established positions.

10. A locking differential power transmission for use with a power source comprising a rotatable case adapted to have fluid therein and responsive to application of power from said source to rotate about its axis of rotation, a differential gear set in said rotatable case mounted therein for limited relative lost-motion movement about said axis, a pair of driven shafts extending into said rotatable case and operatively coupled for differential action with different elements of said differential gear set, a cylinder means in said differential case extending radially with respect to said axis and open at its radially inner end and closed at its radially outer end and integral with said differential case, a piston means reciprocably disposed in said cylinder means and having a one-way valve therein for allowing fluid from said differential case to flow only into the closed end of said cylinder means on reciprocation of said piston means, means operably connected between one of said shaft members and said piston means for reciprocating the piston means when said one shaft rotates relative to said cylinder means, passage means having communication with the closed ends of said cylinder means for discharging fluid from said cylinder means, valve means in said passage means for closing and opening said passage means, and control means operatively connected between said rotatable case and said gear set for opening and closing said valve means respectively in response to relative movements between said rotatable case and said gear set to two different pre-established positions.

11. In a locking differential mechanism for use with a power source, the combination of a differential housing adapted to have fluid therein, a rotatable differential case in said housing adapted to receive fluid therefrom, a spider member in said differential case coaxially arranged therein for limited rotation relative to said case, said spider member having for its legs a plurality of radiating hollow cylindrical members, a pair of side gears disposed in said differential case on opposite sides of said spider member, a plurality of differential pinion gears in mesh with said side gears and rotatably disposed on the outside of said hollow cylindrical members, a plurality of pistons disposed for reciprocation in said cylindrical members, a pair of driven shaft members connected for rotation respectively with said pair of side gears, means operably connected between one of said shaft members and said pistons for effecting reciprocation of the pistons upon rotaton relative to one another of said pair of driven shaft members, a plurality of head members positioned on the outer ends of said hollow cylindrical members, passage means extending through said head members providing communication between the interior of the hollow cylindrical members and the interior of said differential case, valve means in said head members for closing and opening said passage means, and control means operatively connected between said head members and said case for opening or closing said valve means respectively only when the spider member moves rotationally a limited amount in one or the other direction relative to the differential case.

12. A locking differential power transmission for use with a power source comprising a rotatable case adapted to have fluid therein and responsive to application of power from said source to rotate about its axis of rotation, a differential gear set in said rotatable case mounted therein for limited relative lost-motion movement about said axis, a pair of driven shafts extending into said rotatable case and operatively coupled for differential action with different elements of said differential gear set, said differential gear set includnig a cylinder means rotatable therewith and extending radially with respect to the axis of rotation and having its radially outer end closed and adapted to receive fluid from said rotatable case, a piston means reciprocably disposed in said cylinder means, means coupling said pistion means to one of said driven shafts for reciprocating said piston means when said one shaft rotates relative to said gear set, passage means having communication with the closed end of said cylinder means for discharging fluid from the closed end of said cylinder means, valve means in said passage means for closing and opening said passage means, and control means operatively connected between said rotatable case and said gear set for opening and closing said valve means respectively in response to relative movements between said rotatable case and said gear set to two different pre-established positions.

13. In a locking differential mechanism for use with a power source, the combination of a differential housing, a rotatable differential case in said housing, a spider member in said differential case coaxially arranged therein for limited rotation relative to said case, said spider member having for its legs a plurality of radiating hollow cylindrical members, a pair of side gears disposed in said differential case on opposite sides of said spider member, a plurality of differential pinion gears in mesh with said side gears and rotatably disposed on the outside of said hollow cylindrical members, a plurality of pistons disposed for reciprocation in said cylindrical members, a pair of driven shaft members connected respectively to said pair of side gears for rotation therewith, means operably connected between one of said shaft members and said pistons to effect reciprocation of the pistons upon relative rotation of said pair of driven shaft members, a plurality of head members positioned on the outer ends of said hollow cylindrical members for retaining said pinion gears on said hollow cylindrical members, passage means providing communication between the interior of the hollow cylindrical members and the interior of said differential housing, valve means in said passage means for closing and opening said passage means, and control means for opening or closing said valve means respectively only when the spider member moves rotationally a limited amount in one or the other direction relative to the differential case.

References Cited in the file of this patent

UNITED STATES PATENTS

| | | |
|---|---|---|
| 1,178,093 | Moon | Apr. 4, 1916 |
| 2,722,140 | Cabell | Nov. 1, 1955 |
| 2,737,063 | Thomas | Mar. 6, 1956 |